United States Patent [19]

Constable

[11] Patent Number: 4,694,356
[45] Date of Patent: Sep. 15, 1987

[54] MODIFICATION OF COLOR COMPONENT VIDEO SIGNALS TO COMPENSATE FOR DECREASING WHITE SENSITIVITY OF PHOTOGRAPHIC ELEMENT

[75] Inventor: Douglas W. Constable, Rochester, N.Y.

[73] Assignee: Eastman Kodak Company, Rochester, N.Y.

[21] Appl. No.: 776,236

[22] Filed: Sep. 16, 1985

[51] Int. Cl.$^4$ .......................... H04N 5/84; H04N 9/81
[52] U.S. Cl. ..................................... 358/332; 358/244; 358/80; 358/76
[58] Field of Search .................. 358/244, 244.1, 244.2, 358/332, 345, 76–80

[56] References Cited

U.S. PATENT DOCUMENTS

| | | | |
|---|---|---|---|
| 3,633,044 | 1/1972 | Buckstad | 307/230 |
| 3,716,297 | 2/1973 | Wakabayashi | 355/67 |
| 4,158,859 | 6/1979 | Kerbel | 358/228 |
| 4,339,769 | 7/1982 | Fujita et al. | 358/244 |
| 4,403,249 | 9/1983 | Knop et al. | 358/80 |
| 4,438,453 | 3/1984 | Alston | 358/78 |
| 4,459,616 | 7/1984 | Lemke | 358/244 |
| 4,468,693 | 8/1984 | Fujita et al. | 358/78 |
| 4,473,849 | 9/1984 | Cool | 358/332 |
| 4,500,919 | 2/1985 | Schreiber | 358/78 |
| 4,520,403 | 5/1985 | Burkhardt et al. | 358/332 |

OTHER PUBLICATIONS

Philips Report No. EJV 8301 for the TDA 3563 NTSC Demodulator Single Chip Decoder.
Electronics, 9/22/81; pp. 121–125.

Primary Examiner—Raymond F. Cardillo
Assistant Examiner—Robert A. Weinhardt
Attorney, Agent, or Firm—William F. Noval

[57] ABSTRACT

A color video printer for producing a color photographic copy from a color video signal. A self-processing color photographic element is exposed to a sequence of six color field images constituting a full frame of a color video image. The printer includes a monochrome cathode-ray-tube (CRT) and a rotatable color filter have red (R), green (G) and blue (B) filters which are sequentially moved into an optical path between the CRT and the photographic element positioned at an exposure station. A video signal circuit provides a color video signal including concurrent R,G,B component signals which are modified with additional gain in the near white region to compensate for the drop off in white sensitivity of the photographic element in this region. A gate is selectively actuated to apply one of the white compensated color component signals to the CRT to effect exposure of the photographic element. Adjustable controls are provided to adjust the relative amount of red, green and blue signal contributing to the photographic exposure.

3 Claims, 9 Drawing Figures

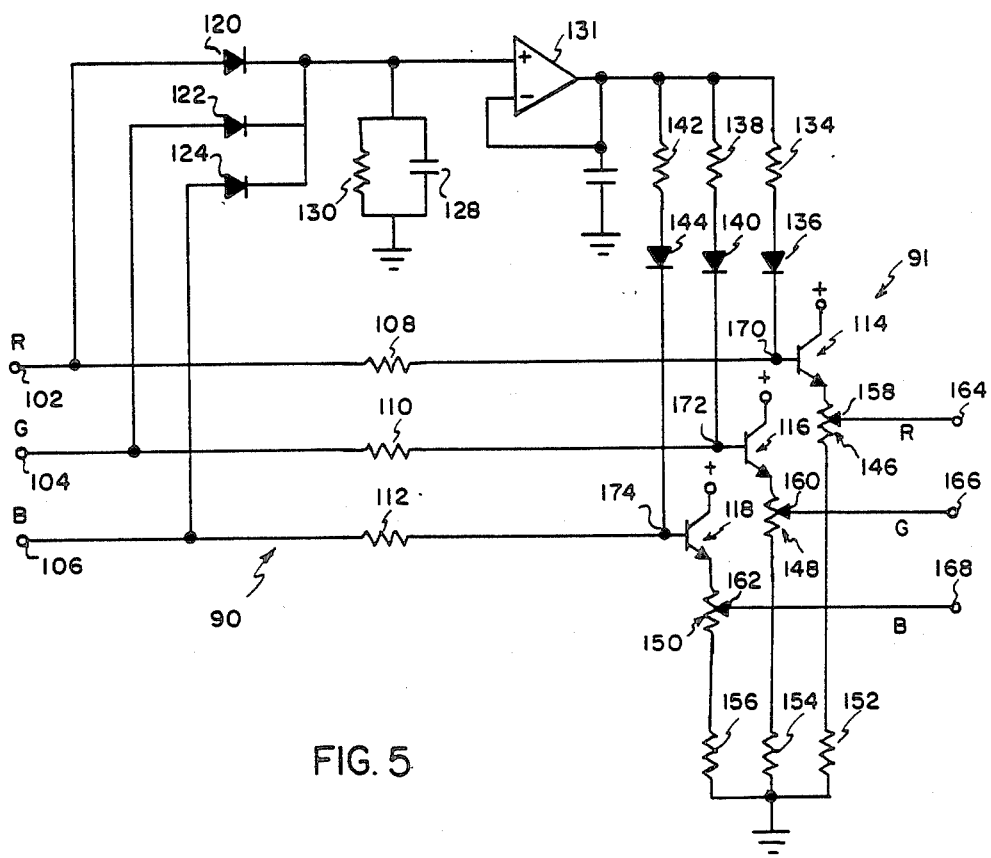
FIG. 5
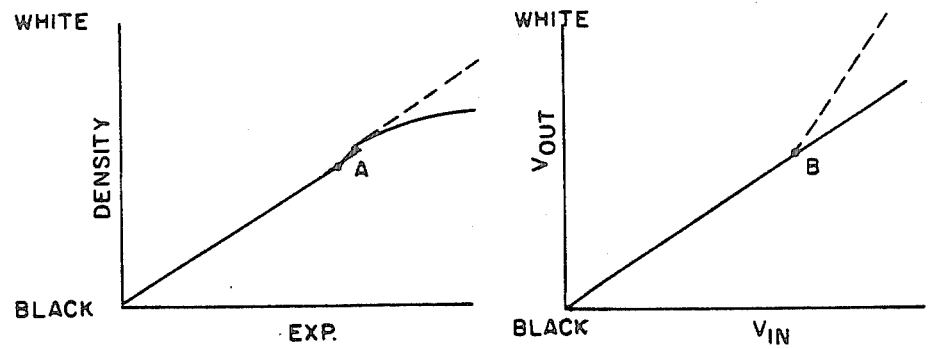
FIG. 7a
FIG. 7b

MODIFICATION OF COLOR COMPONENT VIDEO SIGNALS TO COMPENSATE FOR DECREASING WHITE SENSITIVITY OF PHOTOGRAPHIC ELEMENT

CROSS-REFERENCE TO RELATED APPLICATIONS

U.S. patent application Ser. No. 776,234, entitled MICROPROCESSOR CONTROL FOR A COLOR VIDEO PRINTER, by Harold J. Barrett, filed Sept. 16, 1985; U.S. patent application Ser. No. 776,233, entitled COLOR VIEWER FOR A COLOR VIDEO PRINTER, by Dana W. Wolcott, field Sept. 16, 1985; U.S. patent application Ser. No. 776,232, entitled COLOR VIDEO PRINTER, by Dana W. Wolcott, filed Sept. 16, 1985; and U.S. patent application Ser. No. 776,231, entitled VIDEO SIGNAL PROCESSING CIRCUIT FOR A COLOR VIDEO PRINTER, by Douglas W. Constable, filed Sept. 16, 1985.

BACKGROUND OF THE INVENTION

In general, this invention relates to a color video printer for producing a color photographic copy from a color video signal. In particular, this invention relates to a color video printer in which a color video signal is modified with additional gain in the near white region of the signal to compensate for the decreasing sensitivity in the near white region of a self-processing photographic element.

Several techniques have been proposed to make a color copy from a color video signal. If a still camera is used to directly photograph an image displayed on a color video monitor, difficulties arise which result in poor copy quality such as in synchronizing the shutter speed of the camera with the field rate of video image displayed on the monitor and in positioning the camera relative to the monitor screen. Moreover, there is no simple method to compensate for the relative insensitivity of the photographic material in the near white region. Another proposed video printing technique divides the color video signal into red, blue and green component video signals which are sequentially displayed on a monochrome monitor (See e.g., U.S. Pat. Nos. 4,473,849 and 4,468,693). The screen of the monitor is photographed through stationary color filters corresponding to the color component signal applied to the monitor. This technique is time consuming since color film is exposed to several video frames of each color component signal. Although the apparatus disclosed in the referenced patents provide for adjustment of the video signals prior to exposure in order to compensate for exposure characteristics of the copy film, such adjustments are effected with complex and expensive analog or digital circuitry.

In cross-referenced, copending U.S. patent application Ser. No. 776,232, entitled COLOR VIDEO PRINTER, there is disclosed a compact, easy to use and economical color video printer which provides a full resolution copy of a color video signal in short exposure and processing time. As disclosed, a self-processing color photographic element is exposed to a sequence of six color field images constituting a full frame of a color video image. The color images are produced by a monochrome cathode ray tube (CRT) and a rotatable filter having red, green and blue filters which are sequentially moved at field frequency into an optical path between the CRT and the photographic element. A video signal circuit provides a color video signal including concurrent red, green and blue component signals. A selectively actuated gate applies one of the color component signals to the CRT to effect exposure of the photographic element.

In such a color video printer, it is desirable to provide a simple and inexpensive technique for modifying the color component signal applied to the CRT, in order to compensate for the decreasing sensitivity in the near white region of the self-processing photographic element. It is also desirable to provide for simple and inexpensive controls to adjust the relative amount of red, green and blue signal contributing to the photographic exposure in order to compensate for variability in CRT phosphor characteristics from printer to printer.

SUMMARY OF THE INVENTION

According to the present invention there is provided a color video printer for producing a color photographic copy from a color video signal in which the decreasing sensitivity in the near white region of the self-processing photographic element is compensated for by a simple and inexpensive video signal processing circuit. The printer includes a monochrome CRT which effects exposure of a self-processing photographic element having such an exposure characteristic. The video signal processing circuit modifies red, green and blue component signals applied to the CRT by providing additional gain for the signals in the near white region to compensate for such white sensitivity characteristic.

According to another aspect of the invention, the video signal processing circuit includes adjustable controls for adjusting the relative amount of red, green and blue component signal applied to the CRT to control the relative contributions of each color to the exposure of the photographic element. Thus, variability in CRT phosphor characteristics from printer to printer may be compensated for in a simple, inexpensive and efficient manner.

DESCRIPTION OF THE DRAWINGS

In the detailed description of the invention presented below, reference is made to the accompanying drawings in which like elements are numbered with like numbers.

FIG. 5 is a schematic diagram of a preferred embodiment of white compensation and signal adjustment circuit according to the present invention;

FIGS. 7A and 7B are respectively an exposure characteristic curve of a self-processing photographic element and a signal level curve of a color component video signal.

DESCRIPTION OF THE PREFERRED EMBODIMENT

In the following description of a color video printer incorporating a preferred embodiment of video signal compensation circuit of the present invention, the printer will be described with respect to the processing of an NTSC color video signal which is the standard broadcast signal in the United States, Canada, Japan and other countries. It will be understood that the printer may also be used with other broadcast standards such as the PAL and SECAM systems used in Europe and other parts of the world. In the NTSC system, a single color image is represented by a color video signal constituting a frame of two interlaced odd and even fields. Each color field signal includes luminance and chrominance components which encode three concurrent primary color component signals (red, green and blue). The color video signal is broadcast at 30 frames or 60 fields per second.

Figure 1:
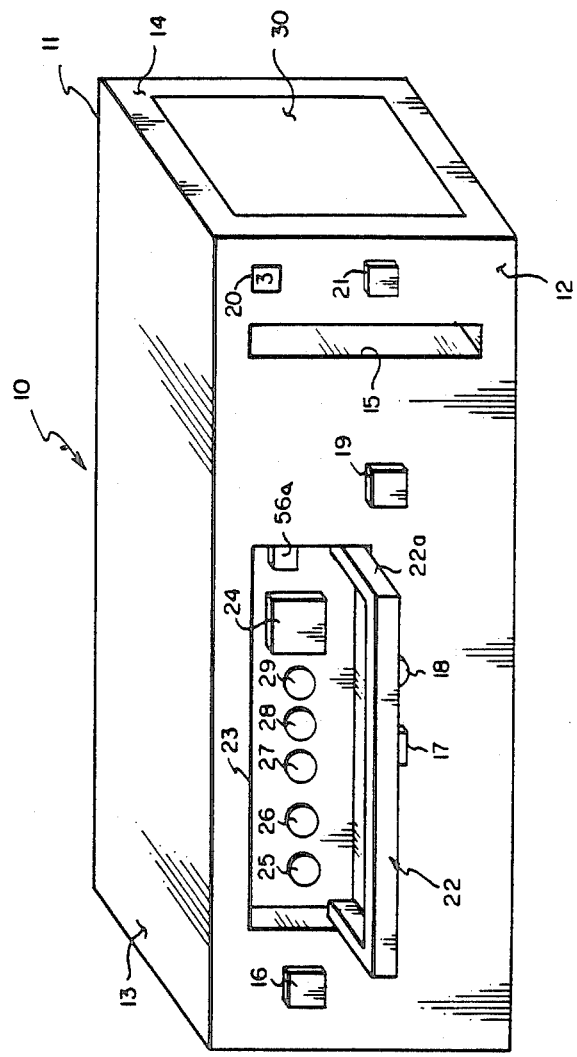
FIG. 1 is a perspective view of a color video printer incorporating the present invention.

Referring now to the figures, there is shown a color video printer incorporating the present invention. In FIG. 1, printer 10 includes a housing 11 having a front panel 12, a top panel 13, and a side panel 14 with a door 30 for inserting packs of self-processing photographic elements into printer 10. Not shown are another side panel, a bottom panel and a rear panel. Front panel 12 includes a print ejection slot 15, a "POWER" switch 16, a "PRINT" switch 17, a "READY" light 18, an "NTSC/RGB" switch 19, and "EXPOSURE NUMBER" dial 20 and a latch 21 for door 30. A cover 22 with lip 22a is mounted on panel 12 and is movable between an open position (as shown in FIG. 1) and a closed position. When cover 22 is in the open position, a recessed panel 23 is accessible to an operator for viewing and adjusting an image. Panel 23 includes an image viewer 24 and adjustable controls 25, 26, 27, 28 and 29 (to be explained later).

Figure 2:
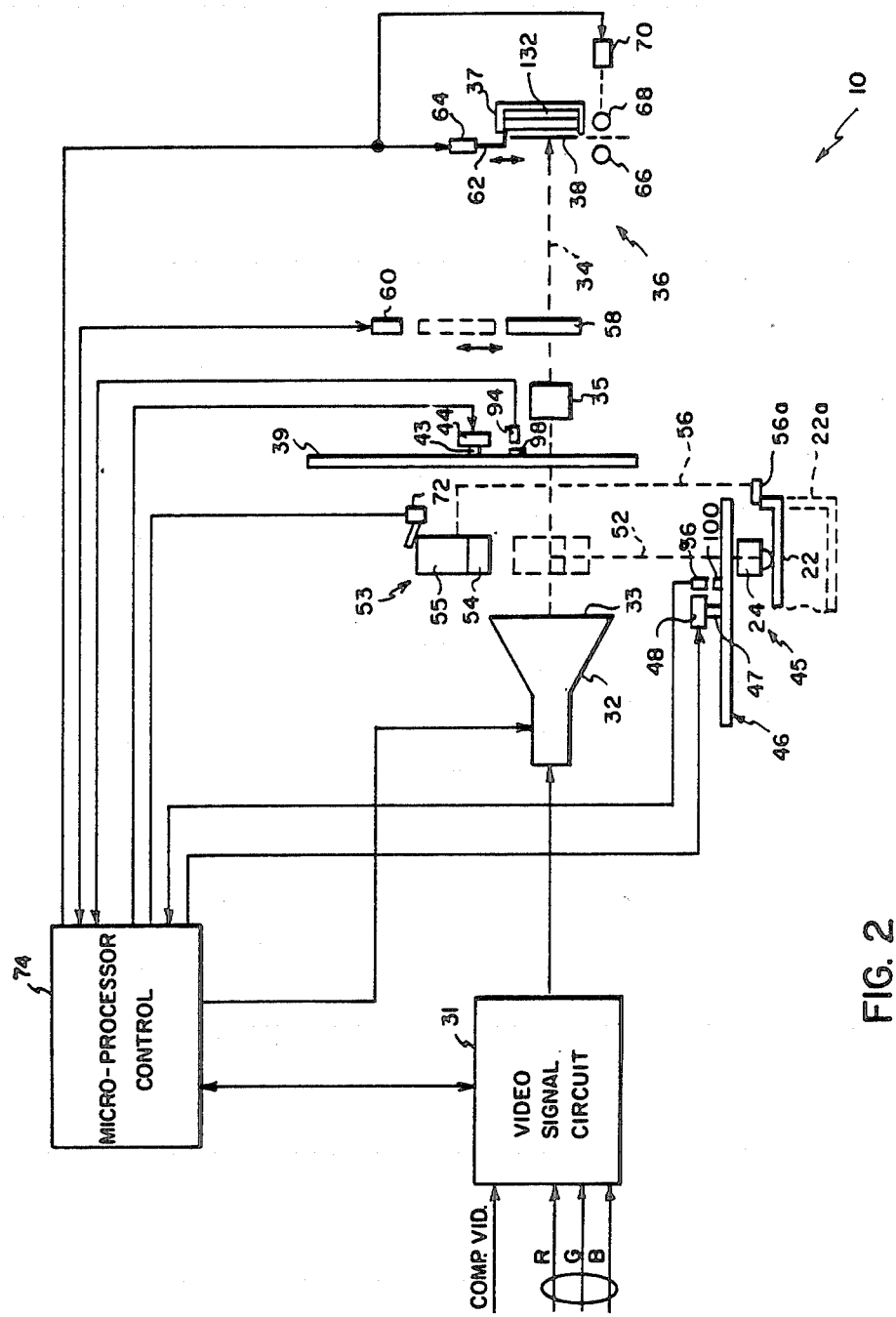
FIG. 2 is a partially schematic, partially diagrammatic view of the printer of FIG. 1.

Referring now to FIG. 2, there is shown a partially schematic, partially diagrammatic view of important components of printer 10. As shown, printer 10 includes a video signal circuit 31 which receives (by actuation of switch 19 on panel 12 in FIG. 1) either a composite color video signal having luminance and chrominance component video signals or an RGB component color video signal having three concurrent primary color signals constituting red (R), green (G), and blue (B) component video signals. The composite color video signal is illustratively described as being in the NTSC format which has a field frequency of sixty fields per second, or a frame frequency of thirty frames per second.

As will be explained in greater detail with respect to FIG. 3, video signal circuit 31 processes either a composite color video signal or an RGB component color video signal to provide a repetitive sequence of RGB primary color component video signals to a monochrome electronic display device such as a monochrome cathode ray tube (CRT) 32. The applied video signal is converted to a monochrome optical image which is displayed on the screen 33 of CRT 32. An exposure station 36 is located along a first (exposure) optical path 34 from CRT 32. Positioned at station 36 is a pack 37 of unexposed self-processing photographic elements 38.

A first (exposure) color filter wheel 39 has (see FIG. 6A) a red filter 40, a green filter 41, and a blue filter 42. Filter wheel 39 is mounted for rotation on shaft 43 and is driven by a motor 44 to sequentially move filters 40, 41 and 42 into optical path 34 in synchronism with the field frequency of the color video signal. Monochrome images displayed on screen 33 of CRT 32 are filtered by filters 40, 41 and 42 to produce color images projected to station 36 by projection lens 35.

Printer 10 also has a viewing station 45 at which an operator may view an image prior to making a print. Viewing station 45 includes a second (viewer) filter wheel 46 mounted on shaft 47 and driven by motor 48. Filter wheel 46 is similar in construction to filter wheel 39 and includes respective red, green and blue filters 49, 50 and 51 (see FIG. 6B) which are sequentially movable into a second (viewer) optical path 52 from CRT 32 to viewer 24. A mirror assembly 53, which includes mirrors 54 and 55, is movable between a position (as shown in solid lines in FIG. 2) which is out of the exposure optical path 34 and a position (as shown in dashed lines in FIG. 2) intercepting optical path 34 and establishing viewer optical path 52. As noted above, cover 22 is movable between a closed position (as shown in solid lines in FIG. 2) in which the viewer 24 is covered, and an open position (as shown in dashed lines in FIG. 2), in which the viewer 24 is uncovered so that an image displayed on CRT 32 may be viewed by an operator. When cover 22 is open, mirror assembly 53 is moved by coupling 56 into optical path 34. When cover 22 is closed, lip 22a of cover 22 contacts finger 56a of coupling 56 to move mirror assembly 53 out of optical path 34 to permit printing of the image produced by CRT 32. The construction and operation of coupling 56 and optical assembly 53 is described in greater detail in cross-referenced, copending U.S. patent application Ser. No. 776,233, entitled COLOR VIEWER FOR A COLOR VIDEO PRINTER.

Printer 10 includes a shutter 58 movable into and out of optical path 34 by means of solenoid 60. A print eject assembly includes a pusher arm 62 actuated by a solenoid 64 and a pair of processing and eject rollers 66 and 68 rotatably actuated by motor 70.

Printer 10 also includes a detector 73 for detecting when assembly 53 is out of path 34 (which indicates cover 22 is closed). Operation of printer 10 is controlled by microprocessor control 74 which includes a microprocessor (such as the INTEL 8051), programming of which is well known to those skilled in the art.

Figure 3:
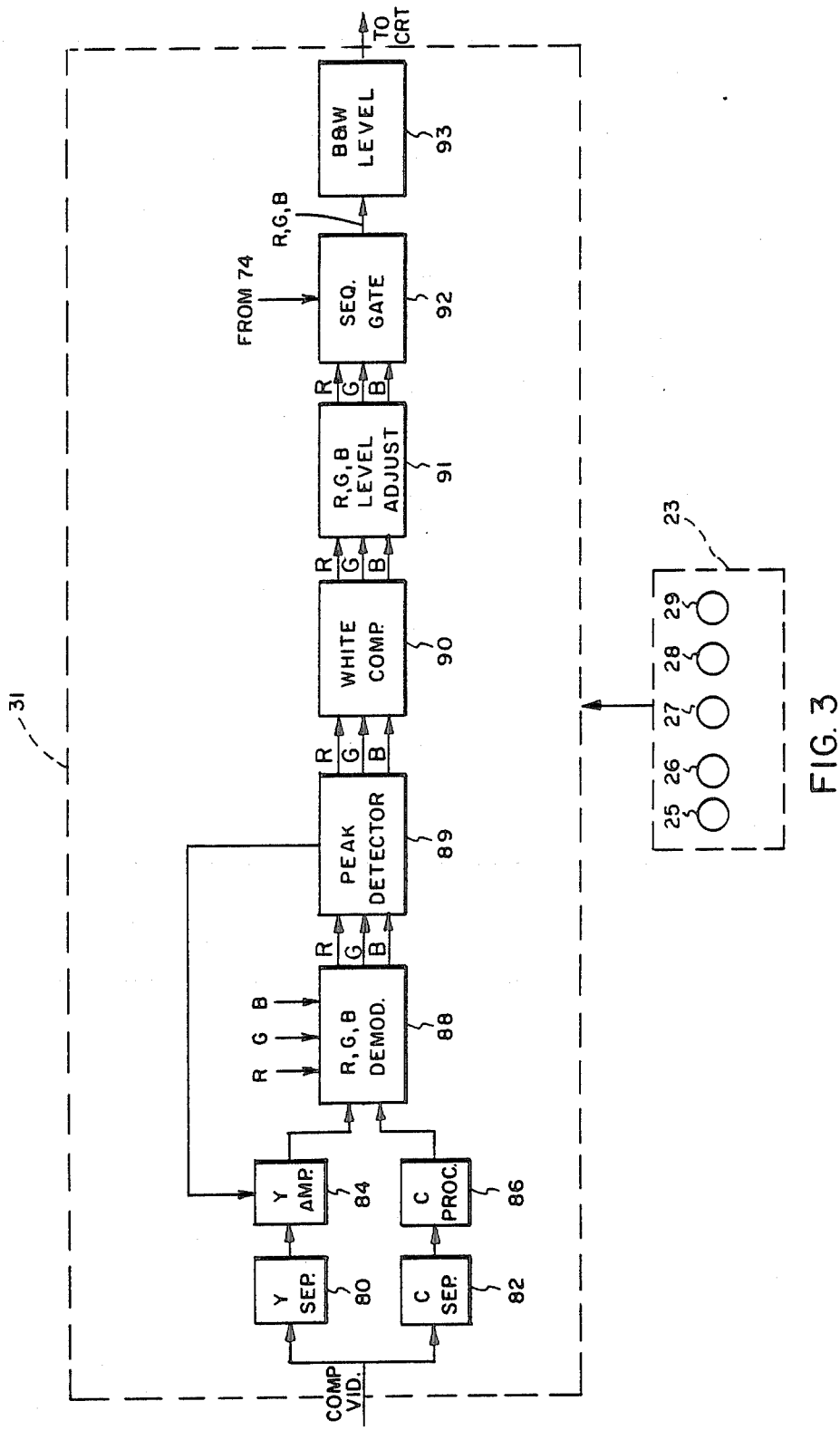
FIG. 3 is a block diagram showing in greater detail the video signal circuit shown in FIG. 2.

Video signal processing circuit 31, according to the present invention, is shown in greater detail in FIG. 3. A composite color video signal received by video signal circuit 31 is applied to luminance (Y) separating circuit (Y SEP.) 80 and chrominance (C) separating circuit (C SEP.) 82. Circuits 80 and 82 respectively separate the Y and C component signals from the composite video signal. The Y signal is amplified by variable gain amplification circuit (Y AMP.) 84 and the C signal is amplified and processed by chrominance processing circuit (C PROC.) 86. The Y and C signals are then applied to demodulation circuit (RGB DEMOD.) 88 which demodulates concurrent red (R), green (G) and blue (B) color component signals from the luminance and chrominance component signals. Circuit 88 also receives external R, G, B video signals and processes them.

The RGB component signals are applied to a peak signal level detector circuit (PEAK DETECTOR) 89 which detects whether one of the component signals exceeds a predetermined maximum level. If a signal exceeds the maximum level, such signal is limited to the maximum level and a detection signal is applied to Y AMP circuit 84 to reduce the gain of circuit 84 and thereby the level of the luminance signal and consequently, the level of the excessive color component signal to equal the maximum level.

According to a feature of the present invention, the R, G, B signals are then applied to a white compensation circuit (WHITE COMP.) 90 to add additional gain to the signals in the near white region thereof to compensate for the decrease in sensitivity in the near white exposure region of self-processing photographic element 38. According to another feature of the present invention, the white compensated R, G, B signals are applied to RGB LEVEL ADJ. circuit 91 which has adjustable controls for adjusting the relative amounts of each color component signal which contributes to exposure of element 38. As will be described later, these features are illustrated more clearly in the preferred embodiment of circuits 91 and 90 schematically depicted in FIG. 5.

Still referring to FIG. 3, the concurrent R, G, B component signals from circuit 91 are applied to a sequential gate 92. Gate 92 is actuated by control 74 to selectively apply one of the three concurrent color component signals to CRT 32. The black and white levels of the color component signal may be adjusted by controls 28 and 29 on subpanel 23. Other operator adjustable controls on subpanel 23 include controls 25 and 26 for respectively controlling the color saturation and hue of the chrominance signal processed by circuits 82, 86 and 88 and control 27 for controlling the detail of the signal processed by video signal circuit 31.

Referring now to FIG. 5, there is schematically shown a preferred embodiment of the present invention. Concurrent R, G and B component signals are respectively applied to input terminals 102, 104 and 106 of circuit 90. White compensation circuit 90 includes resistors 108, 110 and 112 respectively connected between terminals 102, 104, 106, and the bases of buffer transistors 114, 116, and 118. Resistors 108, 110 and 112 have the same resistance values. Diodes 120, 122, 124 are respectively connected between terminals 102, 104, 106 and circuit 126 which includes capacitor 128 and resistor 130. Diodes 120, 122, 124, and circuit 126 constitute a peak white signal detector. Circuit 90 also includes buffer amlifier 131, resistor 134 and diode 136 serially connected between amplifier 131 and the base of transistor 114, resistor 138 and diode 140 serially connected between amplifier 131 and the base of transistor 116, and resistor 142 and diode 144 serially connected between amplifier 131 and the base of transistor 118. Resistors 134, 138, 142 have the same resistance values.

RGB level adjust circuit 91 includes adjustable resistors 146, 148 and 150 respectively connected between the emitters of transistors 114, 116, 118 and respectively resistors 152, 154, 156 to ground. The adjustable wiper arms 158, 160, 162 of respective resistors 146, 148, 150 are connected to output terminals 164, 166, 168 respectively.

The operation of circuits 90 and 91 is as follows. The signal levels of the R, G, B component signals respectively applied to input terminals 102, 104 and 106 are variable between a black level and a peak white level. Each of the R, G, B signals is monitored by the peak white detector circuit constituting respective diodes 120, 122, 124 and circuit 126. When any of the color component signals reaches a peak white level, capacitor 128 is charged up to a voltage level equal to the peak voltage level minus the voltage drop across the respective diode 120, 122, 124. The resistance of resistor 130 is chosen so that capacitor 128 will not discharge appreciably during a field period of the video signal. Amplifier 131 buffers the voltage to which capacitor 128 has been charged and back-biased diodes 120, 122, 124 prevent the application of the voltage on capacitor 128 to respective terminals 102, 104, 106.

Resistor 134, diode 136 and resistor 108 comprise a nonlinear load for the red component signal applied to terminal 102. The output of this network is the node 170 of diode 136 and resistor 108. When the voltage of the signal at terminal 102 is less than the voltage at the output of amplifier 131 less the voltage drop across diode 136, diode 136 will be forward biased. The voltage of the signal applied to terminal 102 will be divided between resistor 134, diode 136 and resistor 108 and a portion of this signal will be applied to node 170.

However, when the voltage of the signal at terminal 102 is more than the voltage at the output of amplifier 131 less the voltage drop across diode 136, diode 136 will be back biased and the full value of the signal at terminal 102 is applied to node 170. The reverse bias region of diode 136 corresponds to the near white region of the video signal and the corresponding near white region of the exposure characteristic of self-processing photographic element 38. This is shown more clearly with reference to FIGS. 7A and 7B.

FIG. 7A is a graph of the exposure characteristic of a self-processing photographic element (such as KODAK TRIMPRINT ® instant film) 38. The density of the exposed element which varies from black to white is plotted against exposure. As shown, the curve is substantially linear over most of the exposure region. In the near white region, above point A the sensitivity decreases. This is an undesirable characteristic resulting in diminished detail in the near white region. According to the present invention, this characteristic is compensated for by stretching the video signal in the corresponding near white region thereof. This is shown in FIG. 7B wherein the normally linear video signal above point B (solid line) is boosted (dashed line) to compensate for the exposure characteristic of the photographic element. This boost in the component video signals results in an increase in sensitivity of element 38 in the near white region (dashed line in FIG. 7A).

Similarly, resistor 138, diode 140 and resistor 110 comprise a nonlinear load for the green component signal applied to terminal 104 and resistor 142, diode 144 and resistor 112 comprise a nonlinear load for the blue component signal applied to terminal 106. The green component signal and the blue component signal respectively applied to terminals 104 and 106 will be compensated in a similar manner as described above with respect to the red component signal. The compensated green and blue signals are applied respectively to nodes 172 and 174.

The relative amount of the red, green and blue component signals which have been white compensated by circuit 90 may be adjusted by adjustment of variable resistors 146, 148 and 150 respectively. This adjustment is made to adjust the relative amounts of red, green and blue images which contribute to the exposure of element 38 in order to compensate for variances in characteristics of cathode ray tubes used in different printers. The adjusted red, green and blue component signals are respectively applied to output terminals 164, 166, 168.

Control of the operation of the printer 10 by means of microprocessor control 74 will now be described. Actuation of switch 16 (FIG. 1) on front panel 12 turns printer 10 on. Control 74 turns on filter wheel motors 44 and 48 to rotate filter wheels 39 and 46, respectively. The rotational speed of wheels 39 and 46 is synchronized with the field frequency of the color video signal processed by printer 10. Since the illustrative NTSC field frequency is sixty fields per second (fps) and filter wheels 39 and 46 have three color filters, each of wheels 39 and 46 are rotated at twenty revolutions per second. The rotational speed of wheels 39 and 46 are respectively sensed by detectors 94 and 96 (FIG. 2) detecting identifying marks 98 and 100 respectively on wheels 39 and 46. As will be described later, marks 98 and 100 also indicate the positioning of the red filters 40 and 49 in optical paths 34 and 52.

Control 74 also applies power to CRT 32 to warm it up. After the CRT 32 is warmed up, a "READY" light 18 on panel 12 (FIG. 1) is turned on indicating to the operator that printer 10 is ready to make a photographic copy of a color video signal.

Figure 6A:
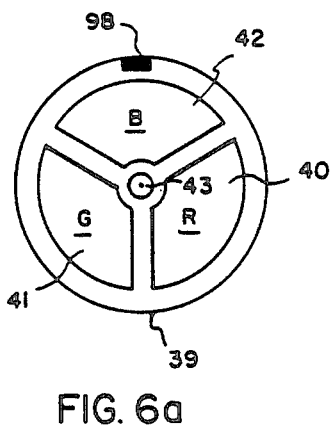
FIGS. 6A and 6B are frontal views respectively of the exposure and viewer filter wheels shown in FIG. 2.
Figure 6B:
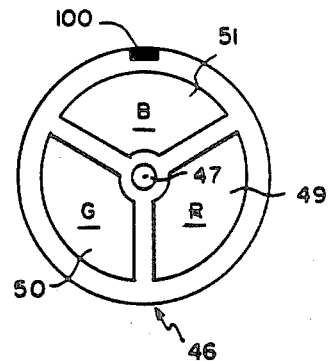

If a copy of a video signal is to be made without any adjustments to the image characteristics thereof (such as color, hue, detail, black and white levels), the operator actuates "PRINT" switch 17 on control panel 12. Upon initiation of the "print" operation, control 74 actuates solenoid 60 to move shutter 58 out of exposure optical path 34. When the mark 98 on filter wheel 39 has been detected by detector 94 to confirm that the red filter 40 (FIG. 6A) of filter wheel 39 intercepts optical path 34, control 74 turns CRT 32 on and actuates gate 92 of video signal circuit 31 to select the red component video signal to be applied to CRT 32. CRT 32 converts the video signal to a monochrome optical image on screen 33 which is converted to a red optical image by red filter 40 (FIG. 6A). The red optical image is projected along path 34 by lens 35 to exposure station 36 to expose a self-processing photographic element 38 positioned at station 36. As filter wheel 39 continues to rotate to sequentially move green filter 41 and blue filter 42 into optical path 34, control 74 actuates gate 92 to sequentially select the corresponding green and blue component video signals to be applied to CRT 32. This sequence is repeated for another sequence of red, green and blue fields. Thus, a photographic element 38 is exposed to six color field images in the sequence red, green, blue, red, green, blue field images.

Figure 4:
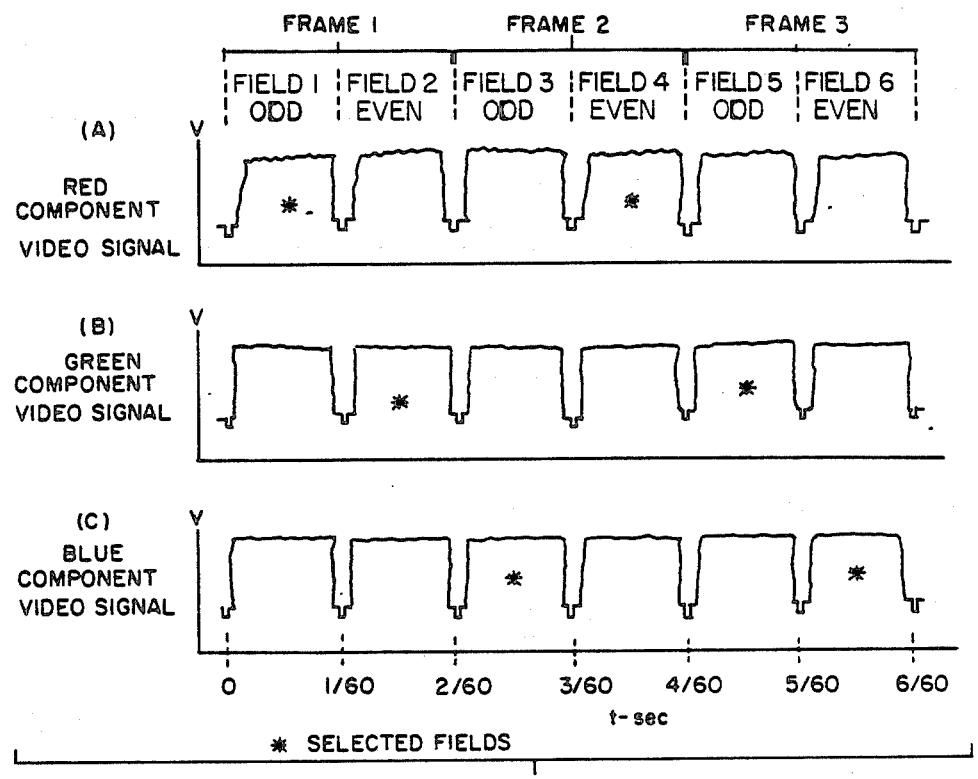
FIGS. 4A, 4B and 4C are respective video signal diagrams illustrating the operation of the printer shown in the Figures.

The sequence of exposure of element 32 is illustrated in FIG. 4. As shown, concurrent red (R), green (G) and blue (B) component video signals are applied to gate 92 for a duration of three frames or six fields of color video signals. Each frame includes interlaced odd and even fields. Microprocessor control 74 is programmed to actuate gate 92 to select only one color component signal from each field of three concurrent color component signals for application to CRT 32. In FIG. 4, the selected color component signal is indicated by "*". Thus, in Field 1, the "odd" red component video signal is selected; in Field 2, the "even" green component video signal is selected; in Field 3, the "odd" blue component video signal is selected; in Field 4, the "even" red component video signal is selected; in Field 5, the "odd" green component video signal is selected; and in Field 6, the "even" blue component video signal is selected. Thus, self-processing photographic element 38 is exposed to a full resolution frame of a color video image having odd and even fields of each of red, green and blue primary colors. The exposure time of element 10 is relatively short-1/10 sec. Where the incoming color video signal represents a relatively static subject in a moving video scene, the resolution of the photographic copy is surprisingly high due to the short exposure time. Printer 10 may thus be used to make copies of such video images.

After exposure, control 74 turns off CRT 32 and actuates solenoid 60 to close shutter 58. Photographic element 38 is ejected from exposure station 36 by actuation of solenoid 64 to cause pusher rod 62 to move element 38 out of pack 37 into the nip of rollers 66 and 68 (dashed lines in FIG. 2) which are rotated by motor 70. As element 38 is moved through this nip, rollers 66, 68 rupture a pod of processing chemicals made integral with element 38 and spread the chemicals uniformly over the exposed image-forming area of element 38. Element 38 self-processes to a finished photographic print outside of printer 10. A particularly exemplary photographic element which may be used in printer 10 is the "Trimprint" ® instant film pack sold by the Eastman Kodak Company, Rochester, N.Y.

After ejection of an exposed self-processing photographic element from exposure station through slot 15 in panel 12 (FIG. 1), printer 10 is ready to make another copy. Spring 132 of pack 37 urges an unexposed photographic element 38 into exposure station 36.

If the operator desires to make adjustments to the characteristics of the color image to be copied, he/she opens cover 22 to gain access to viewer 24 and image controls 25-29 (FIG. 1). Optical assembly 53 is moved into optical path 34 by coupling 56 to establish viewing optical path 52 to viewer 24 (FIG. 2). After detecting red filter mark 100 of the viewer filter wheel 46, microprocessor control 74 turns on CRT 32 and actuates gate 92 to gate through to CRT 32, repetitive sequences of red, green and blue component video signals. Since the rotational speed of viewer filter wheel 46 is synchronized with the field frequency of the incoming color video signal, the operator views the same color image that a photographic element 38 will be exposed to. By adjusting controls 25-29 on panel 12 (FIG. 1) the operator can change the color, hue, detail, black and white level characteristics of the color video image to be copied.

After the adjustments have been completed or if no adjustments are made, the operator closes cover 22 to move optical assembly 53 out of the exposure optical path 34 and exposure of a photographic element may then be effected.

The invention has been described in detail with particular reference to a preferred embodiment thereof, but it will be understood that variations and modifications can be effected within the spirit and scope of the invention.

What is claimed is:

1. Color video printer apparatus for producing a white compensated color photographic copy from a color video signal comprising:

monochrome electronic display means for displaying a monochrome image of a video signal;

an exposure station which is located along an optical path from said display means, and at which is located a color photographic element having an exposure characteristic which is proportional over a major portion of its exposure range and which has decreasing sensitivity over its near white range;

video signal means for providing a color video signal constituting frames of interlaced odd and even fields repeated at broadcast field frequency wherein each field includes three concurrent color component video signals respectively representing first, second and third primary color of a color field image, wherein each of said signals has a signal characteristic which varies linearly between a black and a white level;

white compensating means connected to said video signal means for modifying the signal chracteristic of each of said color component video signals to compensate for the decreased sensitivity in the near white region of said photographic element;

a color filter having first, second and third primary color filters continuously movable into said optical path in synchronism with said field frequency of said color video signal;

selectively actuatable gate means electrically connected between said white compensating means and said display means for applying to said display means one of the three white compensated color component signals; and means for actuating said gate means in response to detection of said first primary color filter being moved into said optical path, to apply to said monochrome display means a sequence of six consecutive compensated color component video field signals constituting odd and even fields of each of said primary colors as respective corresponding filters are sequentially moved into said optical path such that said display means produces a sequence of six consecutive monochrome images which are filtered by respective corresponding color filters to expoxx said photographic element to a sequence of six color field images constituting a full frame of a color video image, wherein said exposed image is white compensated in its near white exposure region.

2. The apparatus of claim 1 wherein said video signal circuit means provides three separate concurrent color component signals, each of which is variable between a minimum signal value representing black and a maximum signal value representing white, and wherein said white compensating means includes peak detecting means for detecting and storing a peak value of any of said signals and means responsive to said stored peak signal value for processing each of said color component signals so that said signals are modified to increase the value of said signal in a region near said maximum signal value to compensate for the decreased sensitivity of said photographic element in said near white region.

3. The apparatus of claim 1 including signal adjusting means for adjusting the levels of each of said white compensated color component signals applied to said gate means in order to adjust a relative amount of said primary colors contributing to exposure of said photographic element.

* * * * *